United States Patent [19]

Israel et al.

[11] 4,298,768
[45] Nov. 3, 1981

[54] CESIUM VAPOR THERMIONIC CURRENT GENERATOR

[76] Inventors: Allan D. Israel, P.O. Box 5627, Lexington, Ky. 40555; Herbert H. Fowler, 1532 Yates Crescent #42, Lexington, Ky. 40505

[21] Appl. No.: 20,180

[22] Filed: Mar. 13, 1979

[51] Int. Cl.³ ................... H01L 37/00; H01L 35/30
[52] U.S. Cl. .................................. 136/202; 136/205; 136/208; 310/306; 313/310
[58] Field of Search ............... 136/202, 205, 208; 310/306; 313/310

[56] References Cited

U.S. PATENT DOCUMENTS

| | | | |
|---|---|---|---|
| 3,259,766 | 7/1966 | Beckjord et al. | 310/306 |
| 3,381,148 | 4/1968 | Creedon et al. | 310/306 |
| 3,397,327 | 8/1968 | Forman et al. | 310/306 |
| 3,548,222 | 12/1970 | Hobson | 310/306 |
| 3,931,532 | 1/1976 | Byrd | 136/202 |

FOREIGN PATENT DOCUMENTS

| | | | |
|---|---|---|---|
| 1263471 | 5/1961 | France | 310/306 |
| 1362742 | 4/1964 | France | 313/310 |
| 797872 | 7/1958 | United Kingdom | 313/310 |

*Primary Examiner*—Leland A. Sebastian
*Attorney, Agent, or Firm*—Jenkins, Coffey, Hyland, Badger & Conard

[57] ABSTRACT

An electron current generator is disclosed which includes a non-electrical heat source, a heat pipe having its first end in thermal relationship with the heat source, and a second end projecting upwardly therefrom and constituting a thermionic emitter enclosed within a chamber containing an alkali metal vapor at a substantially reduced atmospheric pressure. A substantial portion of the chamber wall constitutes a thermionic collector which is cooled by an appropriate cooling means to enhance current generation. A body of liquid metal is disposed between the heat source and heat pipe as a thermal stabilizing agent while a solid state diode is arranged in a forward bias situation in the electrical output of the generator to stabilize the voltage thereby forming a constant voltage current generator.

12 Claims, 3 Drawing Figures

CESIUM VAPOR THERMIONIC CURRENT GENERATOR

BACKGROUND OF THE INVENTION

1. Field of the Invention

The present invention relates generally to direct current generators employing a thermionic emitter within an evacuated chamber, the chamber containing an alkali metal vapor at low vapor pressures. The present invention particularly relates to employing such an apparatus in combination with a non-electrical source of heat to generate a desired direct current.

2. Description of the Prior Art

From the early experiment of Becqueral, Guthrie, Edison and others, it was known that by heating a metal, it is possible to "evaporate" ions or electrons from the metal. This electron or ion emission is related to the temperature of the emitting metal. It has been found that at lower temperatures the thermionic emission from metals is predominantly positive but that at much higher temperatures the negative or electron emission rapidly surpasses the positive and becomes all-important. It is thought that the initial positive emission from metals is largely due to impurities and the positive emission is seen to decrease as a function of time even where the temperature of the metal is held such that predominantly positive emission would be expected.

It has been observed that some metals emit electrons much more copiously than others. A notable example is thorium, an observed film of which on tungsten gives very copious electron emissions at high temperatures. This high temperature electron emission generally follows the Richardson-Dushman equation:

$$I_s = AT^2 e^{-B/T}$$

$I_s$ is the thermionic current density. A is a proportionality constant which for thoriated tungsten is about 3. T is the absolute temperature while e is the base of natural logarithms. B is a constant equal to the work function of the metal divided by the Boltzmann constant. For thoriated tungsten the value of B is approximately 30500. Thus, for all practical purposes, the generation of usable levels of current occurs only when the emitting metal has a temperature above 1500° C.

It is a known practice in the prior art to dispel the electron cloud which tends to form immediately above the surface of the metal during this high temperature electron emission. Thermionic devices containing a low pressure gas are known in the prior art to reduce the space charge since the passage of electrons emitted by the thermionic emitter through the gas will produce ionization by colliding with the gas molecules. The ionization gives rise to more electrons and positive ions, the latter being attracted to the space charge where they neutralize the charge.

In the invention the cesium vapor acts to lower the work function of the nickel of the collector and to eliminate the space charge by ionizing when it comes into contact with the hot tungsten emitter. The ionization of the vapor by electron flow in the low pressure chamber is minor.

Prior art thermionic devices operate with a small spacing, typically 0.005 inch, between the emitter and the collector. However, with such close spacing, a virtual "short" is formed under large current flows, eliminating the potential difference between the emitter and the collector.

The problem, then, is to maintain closeness without suffering the elimination of potential between the emitter and the collector. The closer the spacing between emitter and collector, the more efficient the operation of the thermionic device. The present invention utilizes a conductor and diode network in direct connection between emitter and collector. In order to maintain a potential difference the diode network is inserted in the center of the connector and outside network is inserted in the center of the connector and outside of the vacuum area of the device away from the heat generated by the tungsten. In this operation the distance between the emitter and collector is great enough to create a high resistance so that current flow within the vacuum chamber is small. The current flow is from the emitter through the diode to the collector. By the use of the solid state diode network the potential difference between the emitter and collector is maintained at a constant voltage thereby enabling the power output of the thermionic device to increase.

Quite remarkably, the prior art has failed to appreciate that a large space charge within an area of high resistance can be used to remarkable advantage by leaving the tungsten with a deficiency of electrons resulting in a more positive charge on the tungsten. The large area separating the collector and emitter in the invention does not permit current flow but enhances the flow through the conductor and diode network connection of the emitter and collector.

Therefore, it is the object of the present invention to present a low voltage high current generator which creates dc power directly from a non-electrical source of heat. It is a further object of the present invention to enhance the current generation by providing a means for cooling the collector or anode of the thermionic current generator.

It is a further object of the invention to use at least one diode in the forward bias between the emitter and the collector.

SUMMARY OF THE INVENTION

An electric current generator according to the present invention employs a non-electrical source of heat: burning coal, atomic fission or fusion, or radioactive decay as examples. While electrical resistance heating could be used in the present invention, the heat developed by resistance to a current will not provide sufficient return for generation of an equivalent current by thermionic emission and thus this operation is economically undesirable.

The electric current generator further includes a "heat pipe" having its first end exposed to the source of heat and having a second end projecting upwardly therefrom, the second end constituting a thermionic emitter. The term "heat pipe" as employed here is intended to cover that class of devices constructed generally as a closed multi-layered tube having within it a material which becomes liquid and partly vaporizes upon exposure to a source of heat of the desired temperature. The vapor then travels from the heated end to a more remote end of the pipe and there delivers off the heat carried by the vapor. This heat transmission pipe, while being well known in the prior art for the general purpose of heat transmission, is not known to have been previously constructed to constitute a thermionic emitter.

The preferred heat pipe of the present invention has a second end as previously described which comprises the thermionic emitter of an alkali vapor filled diode. The preferred material for construction of at least the second end of the heat pipe would be the well known thoriated tungsten while the vapor employed in the thermionic diode is thought best to be an alkali metal and preferably cesium, the cesium vapor enhancing the thermionic emission of the thoriated tungsten of the heat pipe. A preferred heat pipe utilizes silver as its fluid agent. The silver flows in appropriate areas provided throughout the heat pipe.

A closed chamber surrounds the second end of the heat pipe thereby permitting the alkali metal vapor to be maintained at a substantially reduced pressure with respect to the atmosphere. The reduced pressure prevents the space charge and cesium from being moved towards the walls of the collector and emitter. Given the voltage potential generated, current will not generally flow over a large distance as is well known in the art. The surface of the chamber represents the anode or collector of the thermionic diode and means are provided for cooling the surface of this anode or chamber wall. Preferably the chamber is a nickel alloy, but many alternative devices are shown in the prior art.

In order to maintain the heat pipe-thermionic emitter at an appropriate temperature for optimum thermionic emission, a body of material heated to a liquid state by the heat source can be interposed between the heat source and the heat pipe. In the present invention the material may be selected from the group of metals and metal alloys having boiling points between 1500° C. and 2300° C. Tin is preferred.

Another feature of the present invention is the presence of a voltage stabilizing solid state diode network in order to maintain the desired voltage potential between the thermionic emitter and collector. The diode network can comprise a plurality of solid state diodes situated in series and/or parallel so as to maintain the desired voltage potential yet still provide the required current carrying characteristics. One additional advantage which this voltage stabilizing diode network provides is the ability to then physically space the collector at a sufficient distance from the emitter such that the collector is unaffected by the thermal radiation from the emitter. The electrical current characteristics of the resulting cesium vapor diode are thus improved remarkably over prior art devices.

It is known that a silicone diode has a 0.5 volt IR drop across it when it is forward biased while a germanium diode has a 0.6 volt drop when it is forward biased. It is this inherent constant voltage drop which is utilized in the present invention to maintain a fixed voltage potential. The preferred diode network is one which results in an approximately four volt total IR drop.

Other features of the present invention will become apparent to those skilled in the art upon consideration of the following description of preferred embodiment taken together with the accompanying figures.

DESCRIPTION OF THE PREFERRED EMBODIMENT

Figure 1:
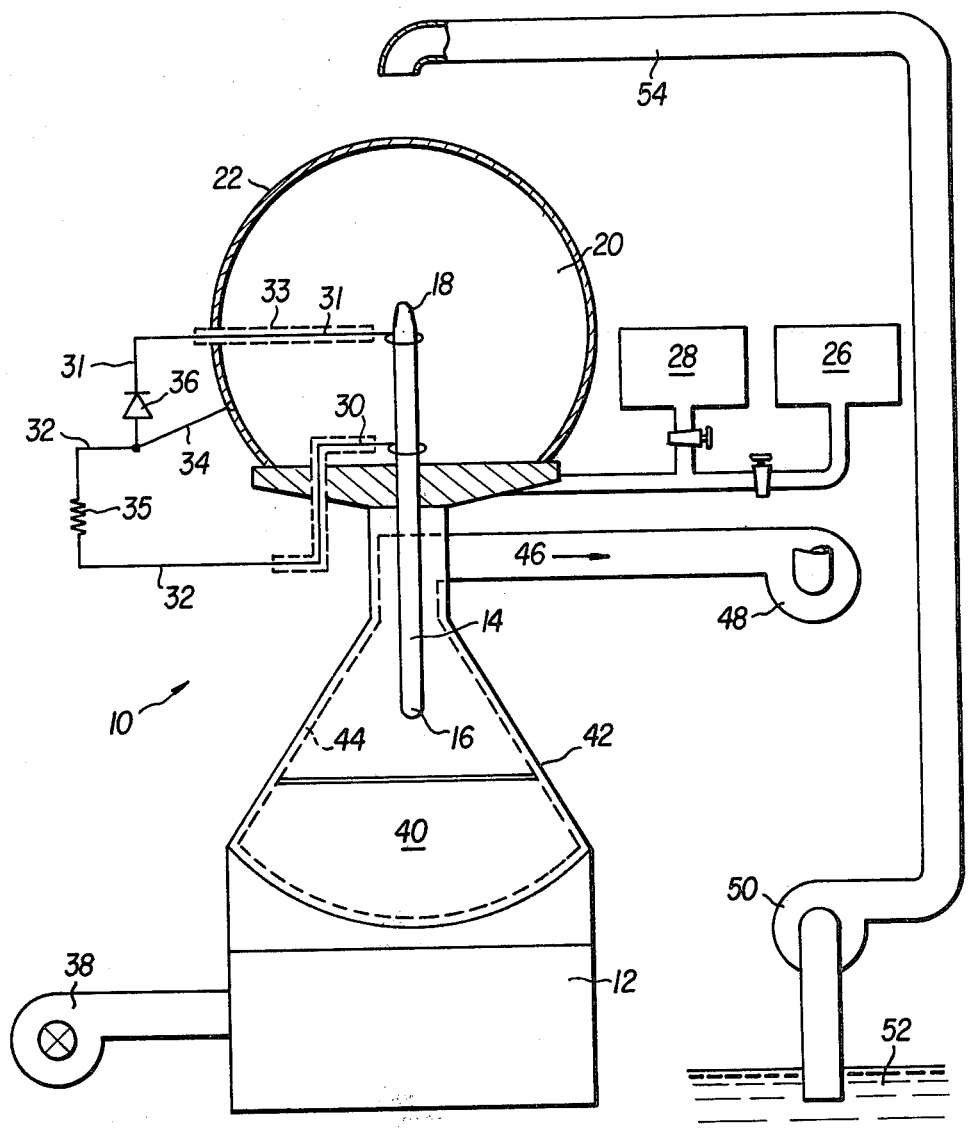
FIG. 1 is a diagramatic view of a preferred embodiment of the invention.

The apparatus 10 illustrated in FIG. 1 embodying the present invention consists generally of a source of heat 12, a heat pipe 14 suspended vertically above the heat source 12 with its lower end 16 in thermal relationship therewith. The upper end 18 of heat pipe 14 is enclosed within a chamber 20. The chamber 20 is defined by a generally spherical metal shell 22 preferably made of nickel alloy positioned on an insulating base 24 made of VYLOR, glass or the like. The chamber is evacuated by vacuum pump 26 following which a small amount of cesium vapor from cesium source 28 is permitted to enter chamber 20 to a pressure of something less than 10 Torr.

The metal surface 22 constitutes the anode or collector of the thermionic current generator while the upper end 18 of the heat pipe constitutes the thermionic emitter or cathode. The emitting surface of the heat pipe is coated with thoriated tungsten. A wire 30 preferably of tantalum surrounds the lower portion of upper end 18 of heat pipe 14 and constitutes the cathode connecting wire 32. Another wire 34 is connected to the anode of collector 22 and between wire 34 and 32 is placed the load 35. A second wire 31 preferably of tantalum is connected to the tip of upper end 18 and traverses chamber 20 inside an insulating sheath 33. The insulating sheath 33 is preferably VYLOR. The wire 31 then connects to at least one voltage stabilizing solid state diode 36. In this arrangement, the apparatus 10 constitutes an essentially constant voltage, direct current supply.

As previously discussed, the heat source 12 can consist of any convenient, generally non-electrical, source of thermal energy such as a coal or trash furnace which may include blowers 38 to assist in development of the appropriate temperature levels. Interposed between the heat source 12 and the heat pipe 14 is a body of material 40 heated to a liquid state by the heat source 12, the material 40 being selected from the group of metals and metal alloys having boiling points between about 1500° C. and 2500° C. Tin is preferred. The liquid body of metal 40 is contained within an appropriate vat 42 lined with refractory brick 44. Any waste heat not delivered to heat pipe 14 exits through exhaust 46 to engine 48. Engine 48 can be used to drive, for example, pumps or the like such as pump 50 for pumping coolant from coolant source 52 through conduit 54 and onto collector surface 22. The cooling means 50-54 significantly enhances the current capabilities by removing the heat from the collector.

In operation of the embodiment illustrated in FIG. 1, the heat source 12 is brought to a temperature such that the body of material 40 is heated to a liquid state and preferably between 1500° C. and 2300° C. Heat is then transferred from the lower end 16 of heat pipe 14 to the upper end 18 at which point the outer surface of upper end 18 undergoes thermionic electron emission. The presence of the cesium vapor within enclosure 20 tends to dissipate the space charge tending to develop around the cathode 18 and also lowers the work function of the nickel alloy surface 22 such that the electrons are readily absorbed without secondary electron emission. This is also aided by the presence of a coolant cooling the surface 22 so as to reduce the thermal energy state of the nickel alloy forming the surface 22.

An alternative method, not shown, involves forming a portion of the tantalum metal conductor outside of the chamber into a coil and immersing the coil appropriately in a container with water. In this embodiment both circuit wire 31 and 32 can be coiled and immersed. The tantalum wire is an excellent heat source capable of heating the water and creating steam thereby eliminating in this embodiment the previously described steam driven coolant system 46, 48, 50, and 52. The vat 42 is made air tight in this embodiment, forcing the heat to exit through the heat pipes 14 and isolating material 40 from contamination. Additionally, the cooling of conductor 31 helps to protect the diode 31 from excessive heat.

Figure 2:
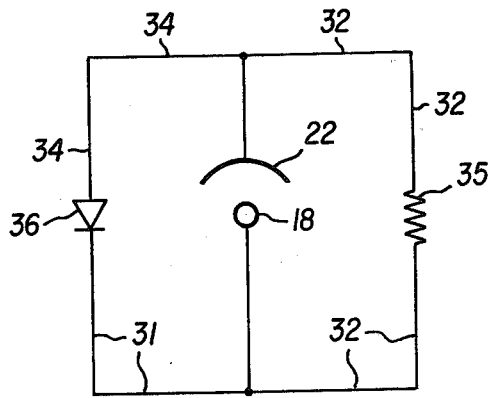
FIG. 2 is a schematic diagram of the electrical circuit presented by the invention.

FIG. 2 illustrates schematically the electrical circuit presented by the embodiment of the invention illustrated in FIG. 1. Similar numerals have been attached to the appropriate corresponding portion of the circuit for ease of identification. As may now be clearly seen from FIG. 2, the circuit operates as follows:

Within the circuit the electron current is from the hot tungsten emitter 18 to the cool nickel alloy collector 22 by way of the tantalum conductor 31 at the top of the emitter. The current gets from the emitter to the collector by going through the forward biased solid state diode network 36. The distance of the collector 22 from the emitter 18 is great enough so as to create a high resistance between the two electrodes 18 and 22 and the resulting current flow within the vacuum chamber 20 will be small. The desired current flow is from the emitter 18, through the solid state diode 36, to the collector 22. After the electrons have been removed from the emitter 18, the tungsten emitter itself becomes positive and "pulls" the electrons from the collector 22 by way of the load 35. Because the solid state diode 36 is forward biased, the electrons on the collector 22 cannot return to the emitter 18 by going through the solid state diode 36 since the diode has a very high resistance to current flow in this direction, i.e., from the collector 22 to the emitter 18. Thus, the only way electrons can return to the emitter 18 is through the load 35. Tantalum wires 32 and 34 are as shown in FIG. 1.

Figure 3:
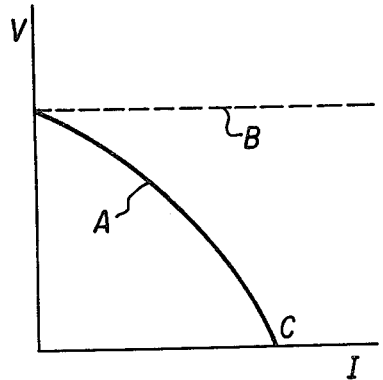
FIG. 3 illustrates graphically the comparable performance of the present invention and prior art devices.

FIG. 3 illustrates graphically the expected improved performance. The graph depicts on the vertical axis the voltage potential between the emitter and collector of a cesium vapor diode while the horizontal axis depicts the current flow through a load of appropriate variable resistance. Curve A is the performance of prior art devices while Curve B is the expected performance of an apparatus constructed according to the present invention. Point C represents a short, a chronic disadvantage of the prior art device. This does not occur in the inventive embodiments.

Structural variations from that illustrated in the preferred embodiment can be made while still remaining within the spirit and scope of the present invention as defined in the appended claims.

We claim:

1. An electron current generator comprising
   (a) a heat source
   (b) a heat pipe having its first end suspended in thermal relationship with the heat source at its second end projecting upward therefrom,
   (c) a closed chamber surrounding said second end and containing an alkali metal vapor maintained at a substantially reduced pressure with respect to the atmosphere,
   (d) cooling means for cooling the surface of the chamber remote from said heat pipe second end,
   (e) a first and a second wire attached to said heat pipe second end, the first wire leading to an electrical load outside said chamber, the second wire traversing said chamber to a voltage stabilizing forward biased solid state diode network outside said chamber and
   (f) an electrical conductor attached to said surface of the chamber remote from said heat pipe second end leading to a common electrical junction between said load and said diode network.

2. An electron current generator comprising
   (a) a heat source
   (b) a heat pipe having its first end suspended in thermal relationship with the heat source at its second end projecting upward therefrom,
   (c) a body of material situated between said head source and said heat pipe, said body of material being heated to a liquid state by said heat source, said material being selected from the group of metals and metal alloys having boiling points between 1500° C. and 2300° C.,
   (d) a closed chamber surrounding said second end and containing an alkali metal vapor maintained at a substantially reduced pressure with respect to the atmosphere,
   (e) cooling means for cooling the surface of the chamber remote from said heat pipe second end,
   (f) a first and a second wire attached to said heat pipe second end, the first wire leading to an electrical load outside said chamber, the second wire traversing said chamber to a forward biased solid state diode network outside said chamber and
   (g) an electrical conductor attached to said surface of the chamber remote from said heat pipe second end leading to a common electrical junction between said load and said diode network.

3. The current generator of claim 2 wherein said material is tin.

4. The current generator of claim 1 wherein said heat source is a coal fired furnace.

5. The current generator of claim 1 wherein said heat source employs atomic fission, atomic fusion or radioactive decay.

6. The current generator of claim 1 wherein said closed chamber comprises a nickel alloy metal surface surrounding but insulated from said heat pipe.

7. The current generator of claim 1 wherein the heat pipe consists of thoriated tungsten.

8. The current generator of claim 7 wherein the heat pipe is provided with areas in which silver flows.

9. The current generator of claim 1 wherein the diode network comprises a multiplicity of solid state diodes connected in series or in parallel.

10. An electron current generator of claim 1 wherein the cooling means comprises an engine driven by waste heat from the heat pipe which pumps coolant from a coolant source through a conduit onto the collector outer surface.

11. An electron current generator of claim 1 wherein the cooling means comprises a container with water from which steam is produced by the heat from the coiled portions of the electrical conductor immersed in the container; said steam driving an engine to pump coolant from a coolant source through a conduit onto the collector outer surface.

12. The current generator of claim 1 wherein said first and second electrical conductor is a tantalum wire in intimate contact with the surface of the heat pipe upper end.

* * * * *